United States Patent
Friedman et al.

(10) Patent No.: US 10,425,438 B1
(45) Date of Patent: Sep. 24, 2019

(54) ENRICHING COMPROMISED DATA USING CORPORATE AND SOCIAL NETWORK INFERRED CONTENT

(71) Applicant: EMC IP Holding Company LLC, Hopkinton, MA (US)

(72) Inventors: Edo Friedman, Kadima (IL); Nir Moatty, Raanana (IL); Tomer Meidan, Ramat-Gan (IL); Tal Bar Zvi, Givataiym (IL); Avi Tzabari, Tel-Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 119 days.

(21) Appl. No.: 14/041,355

(22) Filed: Sep. 30, 2013

(51) Int. Cl.
*H04L 29/06* (2006.01)
(52) U.S. Cl.
CPC .................. *H04L 63/1433* (2013.01)
(58) Field of Classification Search
CPC ............ G06Q 10/107; H04L 65/1079; H04L 2463/146; H04L 63/1441; H04L 63/1483
USPC .......................................................... 726/25
See application file for complete search history.

(56) References Cited

U.S. PATENT DOCUMENTS

| | | | | |
|---|---|---|---|---|
| 5,805,686 A * | 9/1998 | Moller | ..................... | H04M 3/36 379/112.01 |
| 5,850,516 A * | 12/1998 | Schneier | ........................ | 726/25 |
| 8,887,231 B2 * | 11/2014 | Wohlert | ................ | H04L 63/101 726/2 |
| 2007/0299915 A1 * | 12/2007 | Shraim et al. | ................. | 709/206 |
| 2012/0166458 A1 * | 6/2012 | Laudanski et al. | ............ | 707/755 |
| 2012/0239663 A1 * | 9/2012 | Tzruya et al. | ................. | 707/741 |
| 2013/0286947 A1 * | 10/2013 | Lott | ........................ | H04L 12/66 370/328 |

OTHER PUBLICATIONS

Holz, Thorsten, Markus Engelberth, and Felix Freiling. Learning more about the underground economy: A case-study of keyloggers and dropzones. Springer Berlin Heidelberg, 2009.*
MORIARTY, Transforming Expectations for Threat-Intelligence Sharing, RSA Perspective, Aug. 2013, pp. 1-8.
(Continued)

*Primary Examiner* — Syed A Zaidi
(74) *Attorney, Agent, or Firm* — Ryan, Mason & Lewis, LLP

(57) ABSTRACT

Compromised enterprise data is enriched using inferred content from social networks and other public databases. Compromised enterprise data is enriched by obtaining unstructured data from one or more fraudster drop zones; identifying email addresses in the unstructured data; storing each of the identified email addresses in a record with a corresponding name of a person associated with the identified email address; querying one or more databases to update the records with one or more of a corporate employer, location of employment and a corporate position of the person; and aggregating the records. The aggregation can be performed by, for example, a corporate employer field to identify one or more enterprises requiring enhanced security and/or a cybersecurity countermeasure product. The aggregation can also be performed by location of employment or by corporate position to identify individuals that are susceptible to a cybersecurity threat.

20 Claims, 9 Drawing Sheets

(56) References Cited

OTHER PUBLICATIONS

RSA, CyberCrime Intelligence Service, Service Data Sheet, Apr. 14, 2010, pp. 1-2.
RSA, Cybercrime & Online Fraud Workshop, Data Sheet, Jan. 20, 2011, pp. 1-3.
RSA, The RSA Anti-Fraud Command Center, Solution Brief, Jan. 3, 2012, pp. 1-4.
RSA, RSA 2012 Cybercrime Trends Report, White Paper, Jan. 23, 2012, pp. 1-8.
EMA, The Industrialization of Fraud Demands a Dynamic Intelligence-Driven Response, an Enterprise Management Associates, (EMA) White Paper, Mar. 2012, pp. 1-12.
RSA, CyberCrime Intelligence Service—Cybercrime, Fraud Monitoring—EMC, RSA Cybercrime Intelligence Service, http://www.emc.com/security/rsa-fraud-prevention/rsa-cybercrime-intelligence-service.htm, Jul. 19, 2012, pp. 1-3.
EMC, IT Leader Stays Safe with RSA CyberCrime Intelligence Service, Jan. 24, 2013, pp. 1-2.
EMA, The Industrialization of Fraud Demands a Dynamic Intelligence-Driven Response, an Enterprise Management Associates (EMA) White Paper, Jun. 2013, pp. 1-14.
RSA Education Services, Cyber Security and Compliance eLearning Suite, Aug. 2013, pp. 1-3.
Press Release, New RSA CyberCrime Intelligence Service Helps Prevent Theft of Enterprise Data and User Identities, http://www.emc.com/about/news/press/2010/20100415-03.htm, Apr. 15, 2010, pp. 1-2.
Press Release, RSA Combines Blacklist Data Feeds and Threat Monitoring in RSA CyberCrime Intelligence Service, http://www.emc.com/about/news/press/2011/20110817-01.htm, Aug. 17, 2011, pp. 1-3.
Press Release, RSA Unveils Industry-Leading Capabilities for Threat Information Sharing, http://www.emc.com/about/news/press/2012/20120227-01.htm, Feb. 27, 2012, pp. 1-3.

\* cited by examiner

*FIG. 5*

```
                                                         500
                                                        /
  ┌─────────────────────────────────────────────────────┐
  │ WXYZ !"§ $%& / () =?* '<> #|; 23~ @'' ©«»           │
  │ PQRS TUV WXYZ !"§ $%& / () =?* '<> #|; 23~          │
  │ MNO ┌─────────────────────┐ PQRS TUV WXYZ !         │
510─┼────│lennie-james@gmail.com│                       │
  │ om  └─────────────────────┘ wxyz ABC DEF G          │
  │ def ghi jkl mno pqrs tuv                            │
  │ %& / () =?* '<> #|; 23~ @''  ©«» ⌧×{} abc           │
  │ wxyz ABC ┌──────────────┐ DEF GHI JKL MNO           │
  │          │tim-roth@msn.com│                         │
  │ 3~ @'' ╱ └──────────────┘  ©«» ⌧×                   │
  │       ╱ jhonedoe123@fake_domain.il                  │
  └──────╱──────────────────────────────────────────────┘
       520
```

FIG. 6

| LINK TO SOURCE | EMAIL | NAME LEFT | NAME RIGHT | CORP | LEGIT CORP | EXT. ID | FULL NAME | POSITION | CUSTOMER |
|---|---|---|---|---|---|---|---|---|---|
| FAKE_760523 4AABB3CDA05 | info@somewhere.co.uk | | | | | | | | |
| FAKE_346475 234ABB3CAAFF | veronica.roth@gmail.com | | | | | | | | |
| FAKE_760672 354HGJAABB3CD A04 | dennis-farina@snatch.com | | | | | | | | |
| FAKE_760523 4AABB3CDA05 | person1@emc.com | | | | | | | | |
| FAKE_827346 534AABB3234 | antoni.hopkins@movies.uk | | | | | | | | |
| FAKE_123123 234AABB3CDA05 | person2@emc.com | | | | | | | | |
| ... | ... | | | | | | | | |

| LINK TO SOURCE 610 | EMAIL 620 | NAME LEFT 630 | NAME RIGHT 640 | CORP 650 | LEGIT CORP 660 | EXT. ID 670 | FULL NAME 675 | POSITION 680 | CUSTOMER 690 |
|---|---|---|---|---|---|---|---|---|---|
| FAKE_760523 4AABB3CDA05 | info@somewhere.co.uk | | | | NO | | | | |
| FAKE_346475 234AABB3CAAFF | veronica.roth@gmail.com | VERONICA | ROTH | EMC ORGANIZATION | YES | 101 | VERONICA ROTH | VP MARKETING EMEA | |
| FAKE_760672 354HGJAABB3CD A04 | dennis-farina@snatch.com | DENNIS | FARINA | SNATCH | YES | 102 | DENNIS FARINA | ACTOR | |
| FAKE_760523 4AABB3CDA05 | person1@emc.com | ? | ? | EMC ORGANIZATION | YES | | | | |
| FAKE_827346 534AABB3234 | antoni.hopkins@movies.uk | ANTONI | HOPKINS | IMDB SITE | YES | 103 | ANTONI HOPKINS | ACTOR | |
| FAKE_123123 234AABB3CDA05 | person2@emc.com | ? | ? | EMC ORGANIZATION | YES | | | | |
| ... | ... | | | | | | | | |

| EMAIL | CORP | FULL NAME | POSITION | LINK |
|---|---|---|---|---|
| s.john@acme.com | ACME Inc. | [corp user] | | http://en.wikipedia.org/wiki/Acme |
| first.last@acme.com | ACME Inc. | First Last | CFO | http://en.wikipedia.org/wiki/Acme |
| someone@corporate.com | EMC Organization | [corp user] | | http://www.emc.com |
| veronica.roth@gmail.com | EMC Organization | Veronica Roth | VP Marketing EMEA | http://www.linkedin.com/veronicaroth |
| person2@corporate.com | EMC Organization | [corp user] | | http://www.emc.com |
| person1@corporate.com | EMC Organization | [corp user] | | http://www.emc.com |
| antoni.hopkins@movies.uk | IMDB Site | Antoni Hopkins | Actor | http://www.imdb.com |
| burr.steers@pulp-fiction.com | Pulp Fiction | Burr Steers | Roger | http://www.imdb.com/title/tt0110912 |
| phil.lamarr@yahoo.com | Pulp Fiction | Phil Lamarr | Marvin | http://www.imdb.com/title/tt0110912 |
| tim-roth@msn.com | Pulp Fiction | Tim Roth | Ringo | http://www.imdb.com/title/tt0110912 |
| travolta_john@yahoo.com | Pulp Fiction | John Travolta | Vincent Vega | http://www.imdb.com/title/tt0110912 |
| willis_bruce@gmail.com | Pulp Fiction | Bruce Willis | Butch Coolidge | http://www.imdb.com/title/tt0110912 |
| uma_thurman@gmail.com | Pulp Fiction | Uma Thurman | Mia Wallace | http://www.imdb.com/title/tt0110912 |
| paul_calderon@pulp-fiction.com | Pulp Fiction | Paul Calderon | English Bob | http://www.imdb.com/title/tt0110912 |
| eric.stoltz@msn.com | Pulp Fiction | Eric Stoltz | Lance | http://www.imdb.com/title/tt0110912 |
| statham_jason@msn.com | SNATCH | Statham Jason | Turkish | http://www.imdb.com/title/tt0208092 |
| lennie.james@gmail.com | SNATCH | Lennie James | Sol | http://www.imdb.com/title/tt0208092 |
| dennis-farina@snatch.com | SNATCH | Dennis Farina | Cusin Avi | http://www.imdb.com/title/tt0208092 |
| pitt-brad@msn.com | SNATCH | Brad Pitt | Mickey O'Neil | http://www.imdb.com/title/tt0208092 |
| info@somewhere.co.uk | | | | |
| stella@some-isp.com | | | | |
| myname12345@gmail.com | | | | |
| something@somewhere.it | | | | |
| just.aperson@private.domain.net | | | | |
| something@somewhere.com | | | | |

US 10,425,438 B1

ENRICHING COMPROMISED DATA USING CORPORATE AND SOCIAL NETWORK INFERRED CONTENT

FIELD

The field relates generally to fraud detection.

BACKGROUND

Cybercrime is criminal activity committed with computers and/or over a network, such as the Internet. The computer may have been used in the commission of a crime, or it may be the victim of a crime. Cybercrime countermeasures aim to prevent or mitigate the effects of a cyber attack against a computer, server, network or associated device.

A number of countermeasures exist that can effectively combat cybercrime and improve security. The RSA Cyber-Crime Intelligence Service, for example, from EMC Corporation of Hopkinton, Mass., provides information on corporate machines, network resources, access credentials, business data, and email correspondence that may have been compromised by malware (collectively referred to herein as compromised enterprise information). The exfiltration of information can then be controlled, for example, by severing communication between malware-infected resources and drop zones (where a fraudster aggregates stolen data from infected hosts).

Such countermeasure products typically process specific organizational information in large general data repositories containing largely unstructured information retrieved from such drop zones. Thus, searches and queries on the large data repositories are typically focused to predefined criteria for every specific customer (enterprise) and generate reports for these customers about compromised information of their employees and resources (to enable corporate Information Technology (IT) to identify and sanitize infected hosts). Most of the data for the countermeasure products, however, is not being analyzed or clustered in a wider scope that can be leveraged for expanding countermeasure products and services:

A need therefore exists for improved techniques for analyzing and processing large data repositories containing largely unstructured information relating to compromised enterprise information.

SUMMARY

One or more illustrative embodiments of the present invention enrich compromised enterprise data using inferred content from social networks and other public databases. According to one aspect of the invention, compromised enterprise data is enriched by obtaining unstructured data from one or more fraudster drop zones; identifying one or more email addresses in the unstructured data; storing each of the identified email addresses in a record with a corresponding name of a person associated with the identified email address; querying one or more databases to update one or more of the records with one or more of a corporate employer, location of employment and a corporate position of the person; and aggregating the records based on one or more of the corporate employer, location of employment and corporate position of the person. In one exemplary embodiment, the aggregation is performed by a corporate employer field and one or more enterprises are identified requiring enhanced security. In another exemplary embodiment, the aggregation is performed by a corporate employer field and one or more enterprises are targeted requiring a cybersecurity countermeasure product. In other exemplary embodiments, the aggregation is performed by location of employment or by corporate position and one or more individuals are identified that are susceptible to a cybersecurity threat.

According to further exemplary aspects of the invention, the records are updated with (i) a corporate employer of the person obtained from a WhoIs service; (ii) a location of employment of the person obtained from a social network; and/or (iii) a corporate position of the person obtained from a social network.

The improved data processing techniques of the illustrative embodiments overcome one or more of the problems associated with the conventional techniques described previously, and provide increased accuracy and information for risk assessment. These and other features and advantages of the present invention will become more readily apparent from the accompanying drawings and the following detailed description.

BRIEF DESCRIPTION OF THE DRAWINGS

FIG. 5 illustrates a portion of a large general data repository containing largely unstructured information that may be processed in accordance with aspects of the present invention;

FIG. 6 illustrates an exemplary database comprising data that has been extracted from the large general data repository of FIG. 5;

FIG. 7 illustrates an exemplary enriched database that has been processed in accordance with aspects of the present invention to supplement the data in the exemplary database of FIG. 6;

FIG. 8 illustrates an exemplary clustered database that has been processed in accordance with aspects of the present invention to cluster the enriched data in the exemplary database of FIG. 7.

DETAILED DESCRIPTION

Figure 1:
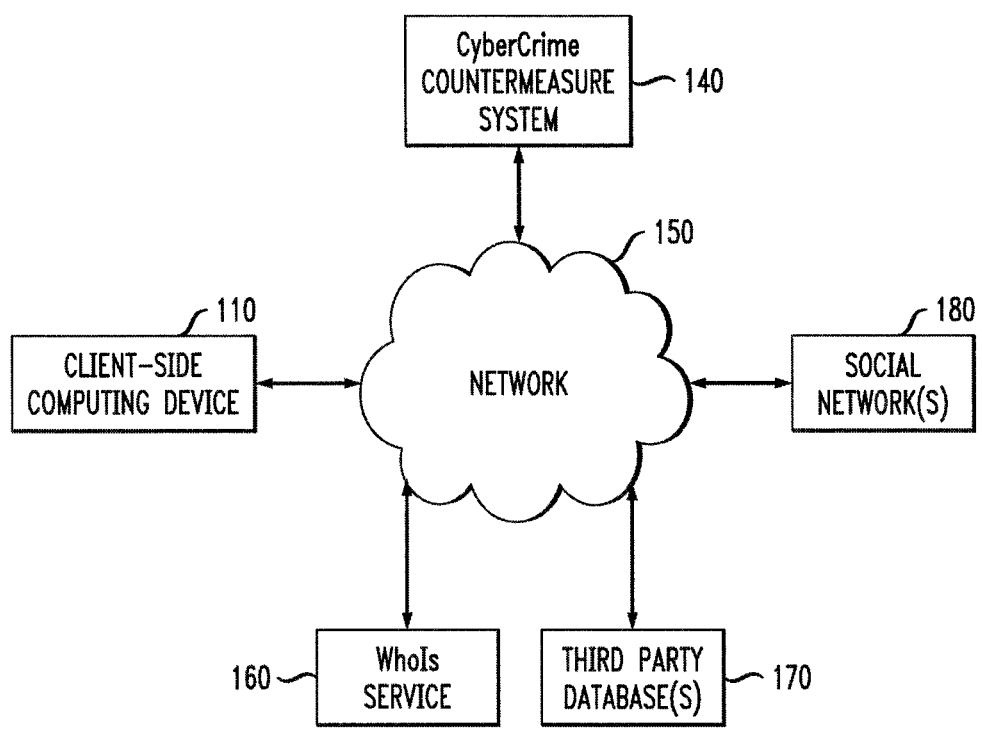
FIG. 1 is a diagram illustrating an example network environment in which one or more embodiments of the present invention can operate.

As will be described, the present invention, in one or more illustrative embodiments, provides techniques for enriching compromised enterprise data using inferred content from social networks and other public databases. Illustrative embodiments of the present invention will be described herein with reference to exemplary communication systems and associated processing devices. It is to be appreciated, however, that the invention is not restricted to use with the particular illustrative system and device configurations shown. Accordingly, a communication system or computing device, as used herein, is intended to be broadly construed so as to encompass any type of system in which multiple processing devices can communicate with one or more other devices.

Aspects of the present invention recognize that the compromised information often comprises address books, being stolen from infected hosts (individuals from specific organizations). These address books (such as an Outlook address book) typically contain email addresses and information of two types: an organizational address book (e.g., containing consolidated list of employees from specific organizations that can later be used for 'spear' Phishing (targeted individual)); and a collection of private address books (e.g., containing emails of miscellaneous people, such as friends, family and acquaintances). Apparently, address books interest some fraudsters who keep this information in their databases for further malicious usage.

Retrieving these records and parsing them (e.g., using email Regular-Expression) enables the storage of specific email addresses into a database (e.g., having user-name and domain name columns). The entries can then be aggregated into distinctive groups (e.g., by domain column) to identify organizations that are targeted for employees' email lists (a potential risk of such compromised data is list of employees who can be targeted for social engineering). While many organizations have multiple domains, not always directly recognized with the corporate name (e.g., a company may own all domains of all acquired companies/startups), the WhoIs service employed by an exemplary embodiment of the invention enables clustering all of the different domains, under one organization.

In order to further enrich the data, another aspect of the invention performs a query on the user-name column to retrieve multiple email addresses containing first and last name of individuals (very often, organizations tend to standardize their employees' email and build it in a first-name<separator>last-name (and vice versa) @organizational-domain, e.g., edo.friedman@company.com. Since separators are shortlisted to only a few characters (underscore, dot, dash) it is easy to resolve the individual's first and last names (and vice versa) (with a regular expression).

After resolving the names, a further query to a social network Application Programming Interface (API) (e.g., LinkedIn, Facebook and/or Twitter) can retrieve enhanced information regarding individuals, including their position in the organization they work in. This information is standard information supplied by, for example, a LinkedIn API (https://developer.linkedin.com/documents/people-search-api#). Enriching individuals' data with working place and position enables key people to be identified in certain organizations that may be targeted for malicious activity.

FIG. 1 illustrates an example client-side computing device (CSCD) 110 (e.g., of an enterprise customer) communicating with an exemplary cybercrime countermeasure system 140 and a plurality of information sources, such as a WhoIs service 160, one or more third party database(s) 170 and one or more social network(s) 180, over a network 150. The network 150 can include, for example, a global computer network such as the Internet, a wide area network (WAN), a local area network (LAN), a satellite network, a telephone or cable network, or various portions or combinations of these and other types of networks.

In at least one embodiment of the invention, the CSCD 110 is a customer server which optionally provides the exemplary cybercrime countermeasure system 140 with data. Such an embodiment can be implemented within the context of a business-to-business (B2B) application. Accordingly, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, or any other information processing device which can benefit from the use of fraud detection techniques in accordance with the invention. It is to be appreciated that a given embodiment of the disclosed system may include multiple instances of CSCD 110 and possibly other system components, although only a single instance is shown in the simplified system diagram of FIG. 1 for clarity of illustration.

The CSCD 110 may also be referred to herein as simply a "customer." The term "customer," as used in this context, should be understood to encompass, by way of example and without limitation, a customer device, a person utilizing or otherwise associated with the device, or a combination of both. An operation described herein as being performed by a customer may therefore, for example, be performed by a customer device, a person utilizing or otherwise associated with the device, or by a combination of both the person and the device. Similarly, information described as being associated with a customer may, for example, be associated with a CSCD device 110, a person utilizing or otherwise associated with the device, or a combination of both the person and the device.

Figure 2:
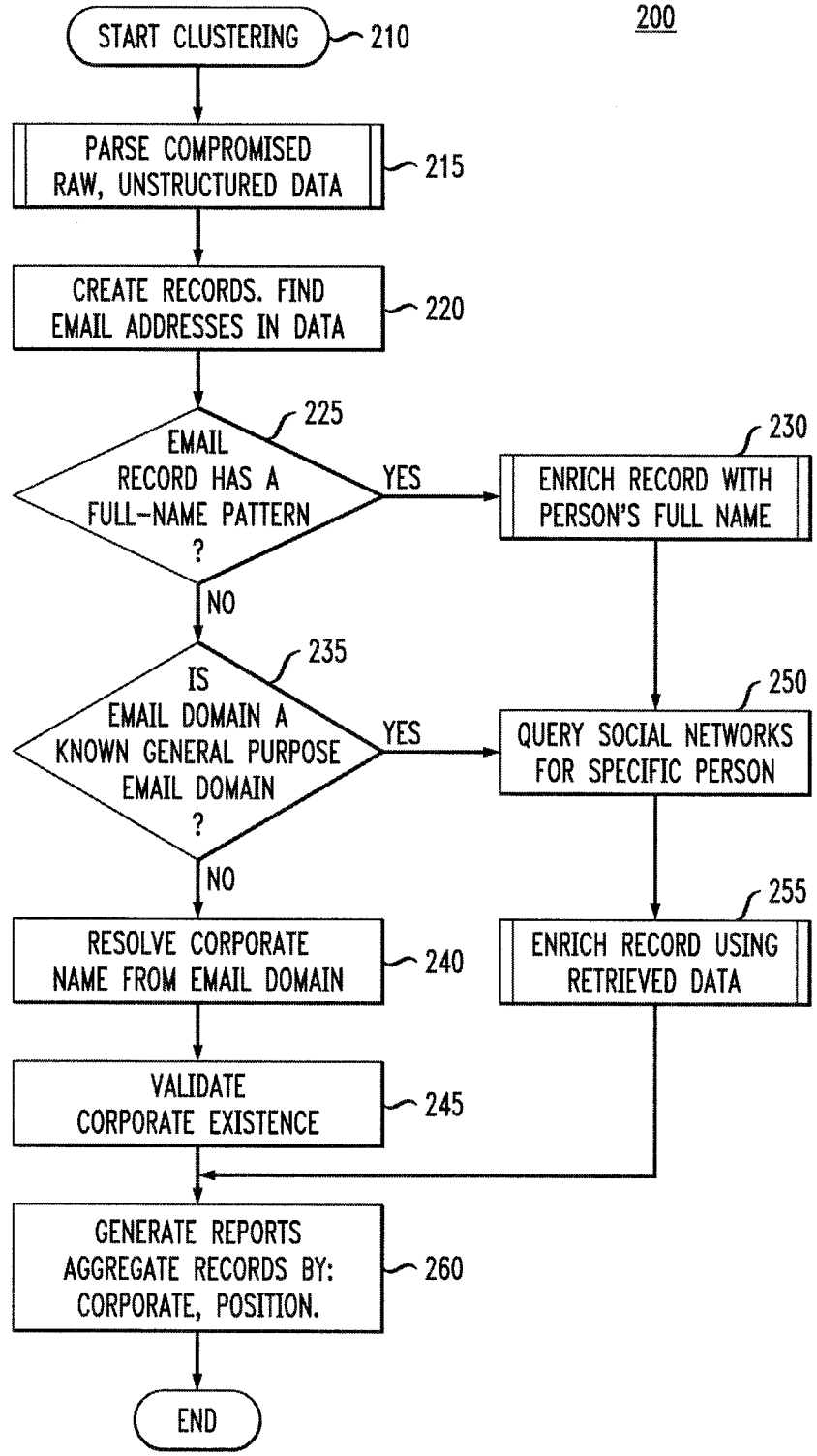
FIG. 2 is a flow diagram illustrating techniques according to an embodiment of the invention.

FIG. 2 is a flow diagram illustrating techniques according to an embodiment of the invention. As shown in FIG. 2, an exemplary database enrichment and clustering process 200 is initiated during step 210. The exemplary database enrichment and clustering process 200 then parses the compromised raw, unstructured data (as discussed further below in conjunction with FIG. 5) during step 215. Records are created during step 220 and email addresses are discovered in the unstructured data.

A test is performed during step 225, to determine if the email record has a full-name pattern. If it is determined during step 225 that the email record has a full-name pattern, then the record is enriched during step 230 with the person's full name. Program control then proceeds to step 250, discussed below.

If, however, it is determined during step 225 that the email record does not have a full-name pattern, then a further test is performed during step 235, to determine if the email domain is a known general purpose email domain. If it is determined during step 235 that the email domain is a known general purpose email domain, then social networks are queried during step 250 for the specific person. The record is then enriched during step 255 using the data retrieved from the social network(s). Program control proceeds to step 260, discussed below.

If, however, it is determined during step 235 that the email domain is not a known general purpose email domain, then the corporate name is resolved from the email domain name during step 240. The corporate existence is then validated during step 245. Program control proceeds to step 260 where reports are generated based on the aggregate records by, for example, corporation and position. Program control then terminates.

Figure 3:
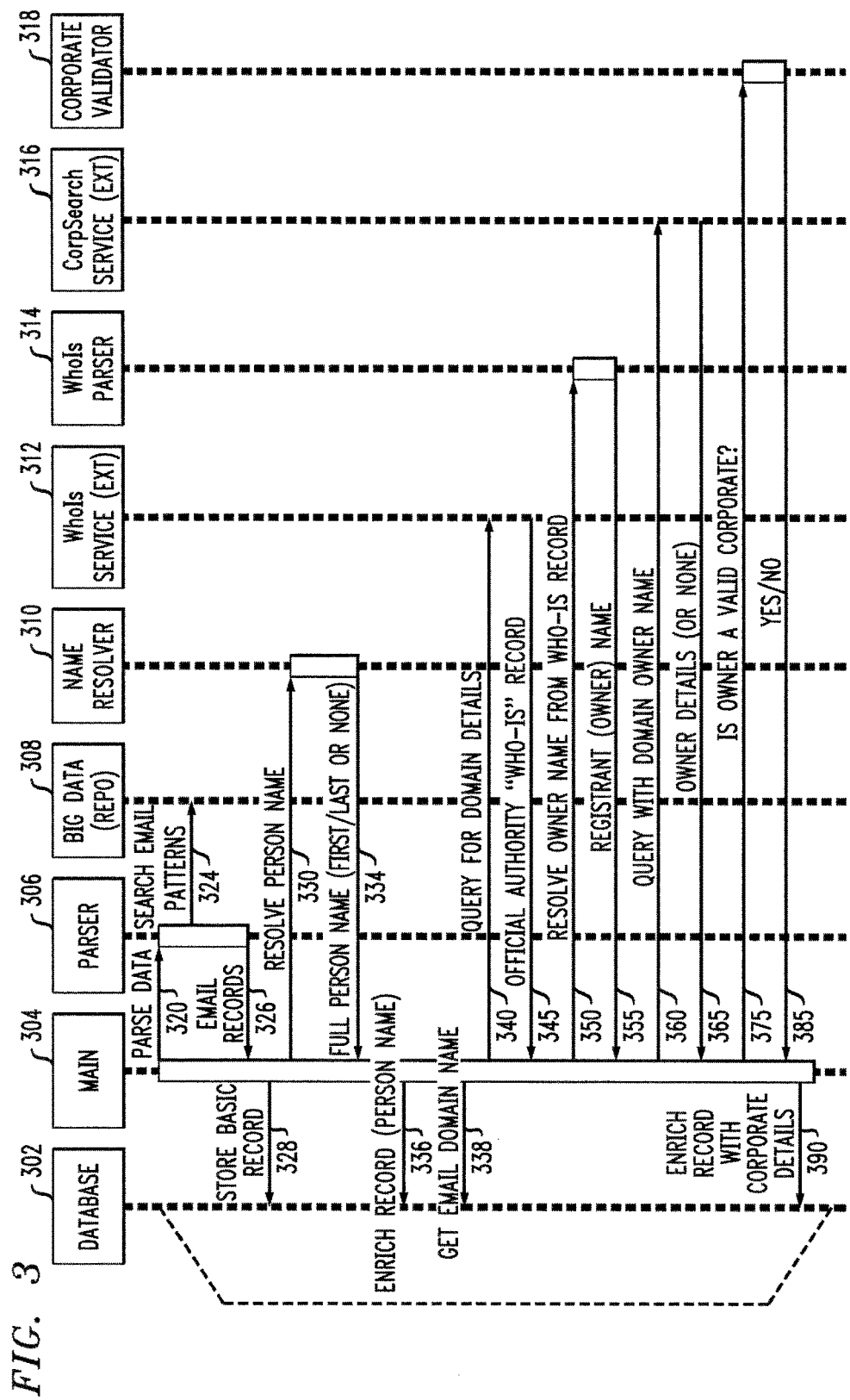
FIGS. 3 and 4 are sequence diagrams illustrating techniques according to an embodiment of the invention.
Figure 4:
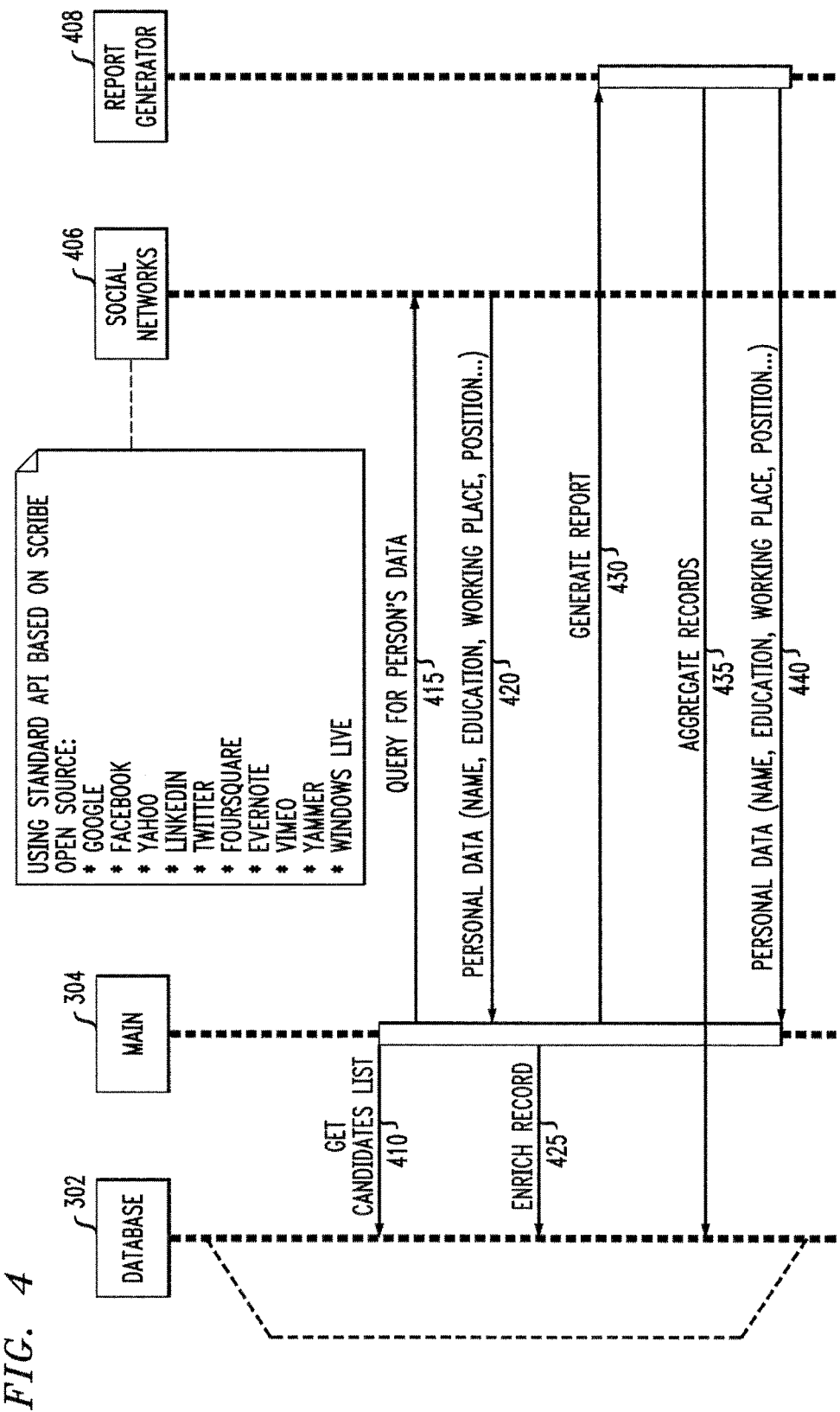

FIGS. 3 and 4, collectively, are sequence diagrams illustrating the communications among the various entities involved in the exemplary database enrichment and clustering process 200.

As shown in FIG. 3, the main process 304 initially instructs a parser 306 to parse the unstructured data (FIG. 5) during step 320. The parser 306 searches for email patterns during step 324 in the unstructured data (FIG. 5) of a big data repository 308. The parser provides the detected email records back to the main process 304 during step 326.

The main process 304 store the basic record comprising the detected email records in a database 302 (FIG. 6) during step 328. The main process 304 then interacts with a name resolver process 310 during step 330 to resolve the person's name. The name resolver process 310 returns the full person name (first/last or none) to the main process 304 during step 334. The main process 304, in turn, enriches the database 302 (FIG. 6) with the obtained person name during step 336.

The main process 304 then obtains the email domain name from the enriched database 302 (FIG. 6) during step 338. The main process 304 uses the obtained email domain name to query a WhoIs service 312 for domain details during step 340. The WhoIs service 312 returns an official authority "Who Is" record to the main process 304 during step 345; and the main process 304 then resolves the owner name from the "Who Is" record during step 350, using a WhoIs parser 314, and receives the registrant (owner) name during step 355.

The main process 304 queries a corporate search service 316 during step 360 with the domain owner name, and receives back the owner details (or none) during step 365. The main process 304 then determines if the owner is a valid corporation during step 375 by contacting a corporate validator 318, and receives a yes/no result during step 385. The main process 304 then further enriches the record in the database 302 with the obtained corporate details during step 390.

As shown in FIG. 4, the main process 304 accesses the database 302 during step 410 to obtain a candidates list and then queries one or more social networks 406 for the person's data during step 415. The one or more social networks 406 return the personal data (e.g., name, education, working place, position, etc.) during step 420. The main process 304 enriches the record in the database 302 during step 425 with the personal data. The main process 304 instructs a report generator process 408 to generate a report during step 430. The report generator process 408 aggregates the records in the database 302 during step 435 and returns the personal data (e.g., name, education, working place, position, etc.) to the main process 304 during step 440.

FIG. 5 illustrates a portion 500 of a large general data repository containing largely unstructured information that may be processed in accordance with aspects of the present invention. As discussed above in conjunction with FIGS. 2-4, an exemplary parser 306 processes the unstructured information in the data repository 308 to identify one or more email addresses, such as addresses 510, 520 that may have been compromised during a cybercrime.

FIG. 6 illustrates an exemplary database 600 comprising data that has been extracted from the large general data repository 308, as shown in FIG. 5. The exemplary database 600 comprises a plurality of records, each associated with a different compromised email address extracted from the large general data repository 308. For each email address, the exemplary database 600 provides a link to the source where the data came from in field 610; the email address in field 620; the left name in field 630; the right name in field 640; the corporation in field 650; an indicator of whether the corporation is legitimate in field 660; an external identifier in field 670; the full name of the person in field 675, the position of the person in field 680 and the customer associated with the person in field 690. It is noted that fields 610 and 620 are populated based on the initial information extracted from the data repository 308 and the remaining fields are populated in accordance with various aspects of the present invention.

FIG. 7 illustrates an exemplary enriched database 700 that has been processed in accordance with aspects of the present invention to supplement the data in the exemplary database 600 of FIG. 6. For example, as shown in FIG. 7, the exemplary database 600 of FIG. 6 has now been populated by the exemplary database enrichment and clustering process 200 to include the left and right names (for example, from email record itself), corporation (e.g., from WhoIs service 312), corporate validity indicator (e.g., from corporate validity service 312, such as a federal or state agency), external identifier, as well as the full name, position (for example, from a social network) and customer of the person in fields 630, 640, 650, 660, 670, 675, 680 and 690, respectively.

FIG. 8 illustrates an exemplary clustered database 800 that has been processed in accordance with aspects of the present invention to cluster the enriched data in the exemplary database 700 of FIG. 7. In the exemplary embodiment of FIG. 8, the enriched data has been sorted by corporation.

Once the entries are aggregated into distinctive groups (e.g., by corporation field 650), organizations can be identified that are targeted for employees' email lists. The sorted corporate listing can be used, for example, to enhance security of existing customers of a cybercrime countermeasure product, or to solicit potential new customers that are not currently subscribed to the service but the hosts of many of their employees are compromised. In addition, if the entries are sorted by the position field 680, or by working place (not shown in FIGS. 6 and 7), key people can be identified in certain organizations that may be targeted for malicious activity.

The basic SMTP (Simple Mail Transport Protocol) is a text-based structured data format between a host server. The structure is:

From: sender@domain.com
To: recipients@domain2.com
(optional CC and BCC emails@domain3.com)
Subject: some text
Body: content of mail The exemplary random data can be the content (Body) of the mail and may contain (as in real data) confidential information (corporate or private). Thus, the real data often contains highly confidential and/or proprietary business plans, finance and/or PII information, which can be identified as compromised by the present invention.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 9:
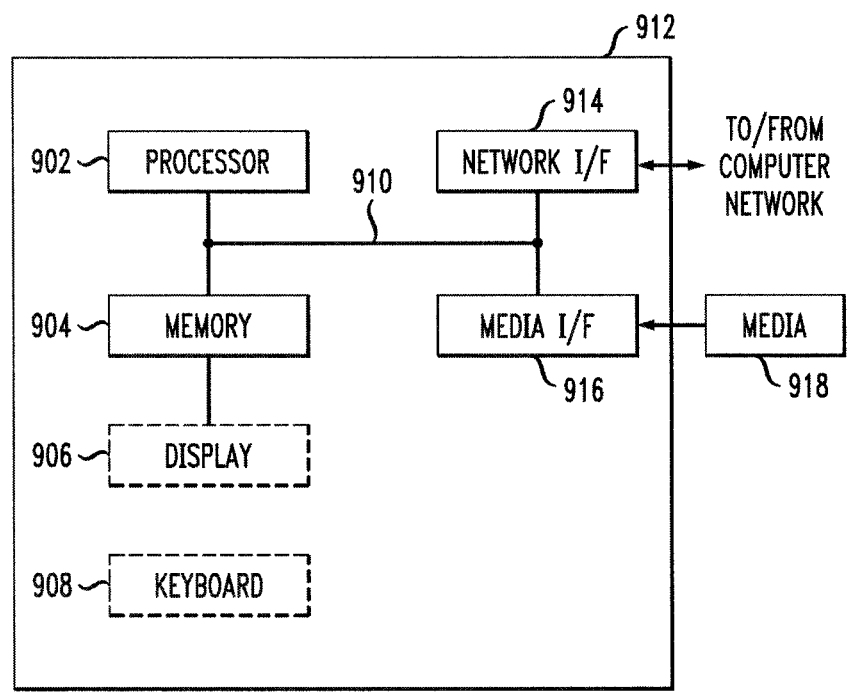
FIG. 9 is a system diagram of an exemplary computer system on which at least one embodiment of the invention can be implemented.

By way of example, an aspect of the present invention can make use of software running on a general purpose computer. As noted above, FIG. 9 is a system diagram of an exemplary computer system on which at least one embodiment of the invention can be implemented. As depicted in FIG. 9, an example implementation employs, for example, a processor 902, a memory 904, and an input/output interface formed, for example, by a display 906 and a keyboard 908.

The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 902, memory 904, and input/output interface such as display 906 and keyboard 908 can be interconnected, for example, via bus 910 as part of a data processing unit 912. Suitable interconnections via bus 910, can also be provided to a network interface 914 (such as a network card), which can be provided to interface with a computer network, and to a media interface 916 (such as a diskette or compact disc read-only memory (CD-ROM) drive), which can be provided to interface with media 918.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 908, displays 906, and pointing devices, can be coupled to the system either directly (such as via bus 910) or through intervening I/O controllers.

Network adapters such as network interface 914 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 912 as depicted in FIG. 9) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit (s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from fraud detection techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   obtaining unstructured compromised data that was obtained from one or more drop zones where a fraudster aggregates stolen data;
   identifying one or more email addresses in said unstructured compromised data;
   storing, using at least one hardware device, said identified email addresses from said unstructured compromised data in corresponding records in at least one memory with a corresponding name of a person associated with said identified email address;
   querying, using at least one hardware device, one or more databases of one or more public databases using the corresponding names of persons associated with said identified email addresses to enrich said records with one or more of a corporate employer, a location of employment and a corporate position of said respective person;
   aggregating, using at least one hardware device, a plurality of said enriched records to sort said enriched records based on at least one of said corporate employer, location of employment and corporate position of said person;
   sorting said aggregated enriched records by: (i) one or more of the location of employment of said person and the corporate position of said person, or (ii) the corporate employer, to identify a cybersecurity threat associated with one or more of: (a) at least one individual of an organization, and (b) at least one organization, respectively; and
   mitigating, responsive to the identification, the cybersecurity threat on at least one host device associated with the one or more of: (a) the at least one individual of an organization, and (b) the at least one organization, respectively.

2. The method of claim 1, wherein said aggregation is performed by a corporate employer field and wherein said method further comprises the step of identifying one or more enterprises requiring enhanced security.

3. The method of claim 1, wherein said aggregation is performed by a corporate employer field and wherein said method further comprises the step of targeting one or more enterprises requiring a cybersecurity countermeasure product.

4. The method of claim 1, wherein said aggregation is performed by said location of employment and wherein said method further comprises the step of identifying one or more individuals susceptible to a cybersecurity threat.

5. The method of claim 1, wherein said aggregation is performed by said corporate position and wherein said method further comprises the step of identifying one or more individuals susceptible to a cybersecurity threat.

6. The method of claim 1, wherein said records are enriched with said corporate employer of said person obtained from a WhoIs service.

7. The method of claim 1, wherein said records are enriched with said location of employment of said person obtained from a social network.

8. The method of claim 1, wherein said records are enriched with said corporate position of said person obtained from a social network.

9. The method of claim 1, wherein said one or more of said records are enriched with said corporate employer of said person obtained from a WhoIs service.

10. The method of claim 1, wherein said records are enriched with said location of employment of said person obtained from a social network.

11. The method of claim 1, wherein said one or more of said records are enriched with said corporate position of said person obtained from a social network.

12. An article of manufacture comprising a non-transitory processor-readable recordable storage medium having processor-readable instructions embodied thereon which, when implemented, cause a processor to carry out the following steps:
obtaining unstructured compromised data that was obtained from one or more drop zones where a fraudster aggregates stolen data;
identifying one or more email addresses in said unstructured compromised data;
storing, using at least one hardware device, said identified email addresses from said unstructured compromised data in corresponding records in at least one memory with a corresponding name of a person associated with said identified email address;
querying, using at least one hardware device, one or more databases of one or more public databases using the corresponding names of persons associated with said identified email addresses to enrich said records with one or more of a corporate employer, a location of employment and a corporate position of said respective person;
aggregating, using at least one hardware device, a plurality of said enriched records to sort said enriched records based on at least one of said corporate employer, location of employment and corporate position of said person;
sorting said aggregated enriched records by: (i) one or more of the location of employment of said person and the corporate position of said person, or (ii) the corporate employer, to identify a cybersecurity threat associated with one or more of: (a) at least one individual of an organization, and (b) at least one organization, respectively; and
mitigating, responsive to the identification, the cybersecurity threat on at least one host device associated with the one or more of: (a) the at least one individual of an organization, and (b) the at least one organization, respectively.

13. The article of manufacture of claim 12, wherein said aggregation is performed by a corporate employer field and wherein said method further comprises one or more of identifying one or more enterprises requiring enhanced security and targeting one or more enterprises requiring a cybersecurity countermeasure product.

14. The article of manufacture of claim 12, wherein said aggregation is performed by said location of employment and wherein said method further comprises the step of identifying one or more individuals susceptible to a cybersecurity threat.

15. The article of manufacture of claim 12, wherein said aggregation is performed by said corporate position and wherein said method further comprises the step of identifying one or more individuals susceptible to a cybersecurity threat.

16. A system comprising:
a memory; and
at least one hardware device, coupled to the memory, operative to implement the following steps:
obtain unstructured compromised data that was obtained from one or more drop zones where a fraudster aggregates stolen data;
identify one or more email addresses in said unstructured compromised data;
store, using the at least one hardware device, each of said identified email addresses from said unstructured compromised data in a record corresponding records in at least one memory with a corresponding name of a person associated with said identified email address;
query, using at least one hardware device, one or more databases of one or more public databases using the corresponding names of persons associated with said identified email addresses to enrich one or more of said records with one or more of a corporate employer, a location of employment and a corporate position of said respective person;
aggregate, using at least one hardware device, a plurality of said enriched records to sort said enriched records based on at least one of said corporate employer, location of employment and corporate position of said person;
sort said aggregated enriched records by: (i) one or more of the location of employment of said person and the corporate position of said person, or (ii) the corporate employer, to identify a cybersecurity threat associated with one or more of: (a) at least one individual of an organization, and (b) at least one organization, respectively; and
mitigate, responsive to the identification, the cybersecurity threat on at least one host device associated with the one or more of: (a) the at least one individual of an organization, and (b) the at least one organization, respectively.

17. The system of claim 16, wherein said aggregation is performed by a corporate employer field and wherein said at least one hardware device is further configured to identify one or more enterprises requiring enhanced security.

18. The system of claim 16, wherein said aggregation is performed by a corporate employer field and wherein said at least one hardware device is further configured to target one or more enterprises requiring a cybersecurity countermeasure product.

19. The system of claim 16, wherein said aggregation is performed by said location of employment and wherein said at least one hardware device is further configured to identify one or more individuals susceptible to a cybersecurity threat.

20. The system of claim 16, wherein said aggregation is performed by said corporate position and wherein said at least one hardware device is further configured to identify one or more individuals susceptible to a cybersecurity threat.

* * * * *